United States Patent [19]

Carreira, Sr.

[11] 4,278,320

[45] Jul. 14, 1981

[54] BINOCULAR STAND FOR ASTRONOMICAL OBSERVATIONS

[75] Inventor: Emmanuel M. Carreira, Sr., University Heights, Ohio

[73] Assignee: Thomas A. Dobbins, Lyndhurst, Ohio

[21] Appl. No.: 98,245

[22] Filed: Nov. 28, 1979

[51] Int. Cl.³ .............................................. G02B 23/18
[52] U.S. Cl. ...................................... 350/26; 248/474
[58] Field of Search ...................... 350/25, 26, 36, 68, 350/8, 18, 81–89; 248/474

[56] References Cited

U.S. PATENT DOCUMENTS

| 450,409 | 4/1891 | Green | 350/68 |
|---|---|---|---|
| 991,591 | 5/1911 | Abraham | 350/68 |
| 1,092,224 | 4/1914 | Nesdall | 350/25 |
| 1,166,343 | 12/1915 | Fielding | 350/68 |
| 1,448,592 | 3/1923 | Heine | 350/18 |
| 2,078,181 | 4/1937 | Land | 350/88 |
| 2,971,080 | 2/1961 | Boughton | 350/87 |

Primary Examiner—Jon W. Henry
Attorney, Agent, or Firm—Quaintance, Murphy & Richardson

[57] ABSTRACT

A device for use with a binocular in order to facilitate astronomical observations includes a mirror supported on a base adjacent to a vertical strut. A binocular is attached to the vertical strut and is aligned downwardly at an angle of approximately 30° with respect to the vertical. Images of astronomical bodies are reflected by the mirror into the binocular. Consequently, an observer may view the images without looking up and with his hands free and with the binocular firmly supported.

5 Claims, 4 Drawing Figures

BINOCULAR STAND FOR ASTRONOMICAL OBSERVATIONS

BACKGROUND OF THE INVENTION

1. Field of the Invention

The instant invention relates to reflecting attachments for binoculars, and more particularly, the instant invention relates to reflecting binocular supports for making astronomical observations.

2. Problem and Prior Art Approaches

When making astronomical observations with binoculars a great deal of discomfort occurs after a relatively short period of time because one must tilt his head back in order to look upward. Moreover, if the binoculars are hand held, they tend to shake slightly distorting the image. In addition, when a person is holding binoculars in his hands, his hands are not free to perform other tasks. Furthermore, the user has no means to control and check the direction in which the instrument is aimed.

U.S. Pat. No. 1,092,224, issued Apr. 7, 1914, discloses the concept of using a mirror with a pair of binoculars in order to make aerial observations without having to tilt one's head back. However, in this patent the mirror is supported on the binoculars and the binoculars are hand held instead of the mirror and binoculars being supported on a separate mounting structure which frees one's hands for other tasks while providing a stable support for the binoculars and a means for determining the observing angle. Accordingly, there is a need for a binocular reflector which is more suitable for astronomical observations than that provided by U.S. Pat. No. 1,092,224.

SUMMARY OF THE INVENTION

In view of the aforesetforth concerns, it is a feature of this invention to provide a new and improved reflecting binocular support particularly suitable for making astronomical observations.

In view of this feature, and other features, the instant invention contemplates a support for a magnifying optical instrument, such as a binocular, wherein the support includes a base having adjustable means thereon for supporting a mirror and a strut for supporting the optical instrument above and in optical alignment with the mirror.

The instant invention further includes means for tilting the mirror with respect to the base and optical instrument in order to provide the desired angle for the mirror.

Other features and advantages of the invention will be pointed out specifically or will become apparent from the following description when considered in conjunction with the accompanying drawings.

DETAILED DESCRIPTION OF THE PREFERRED EMBODIMENT

Figure 1:
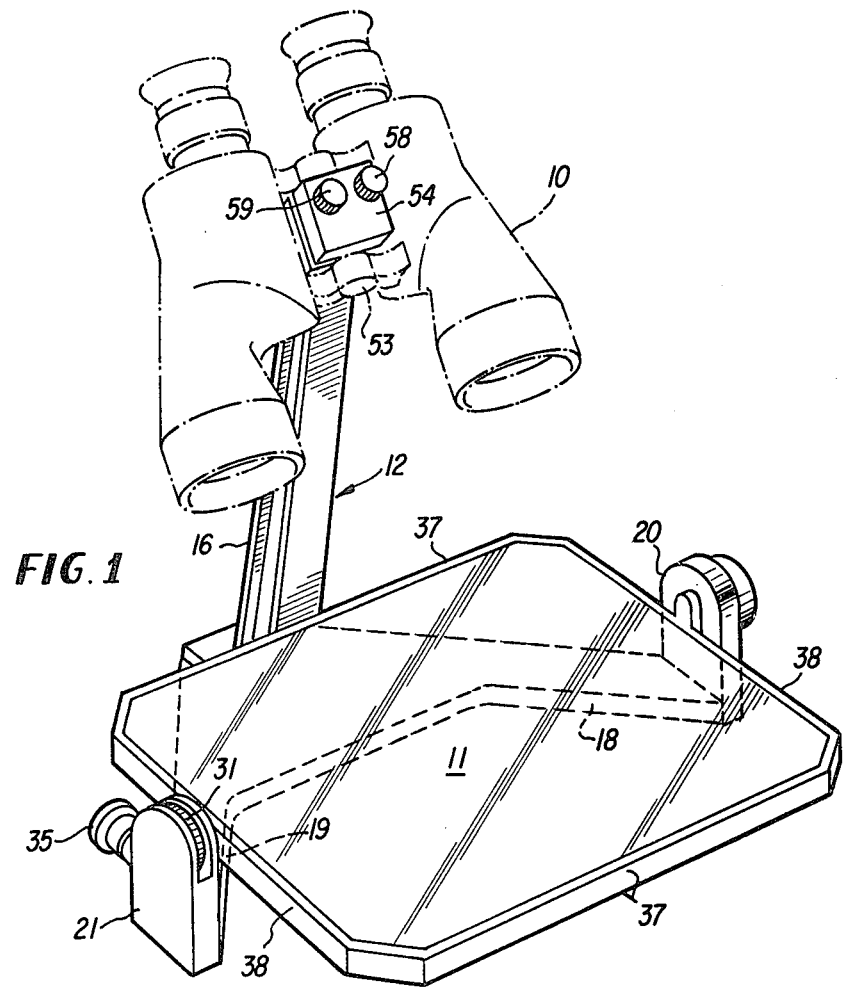
FIG. 1 is a perspective view of a binocular reflector in accordance with the instant invention.
Figure 2:
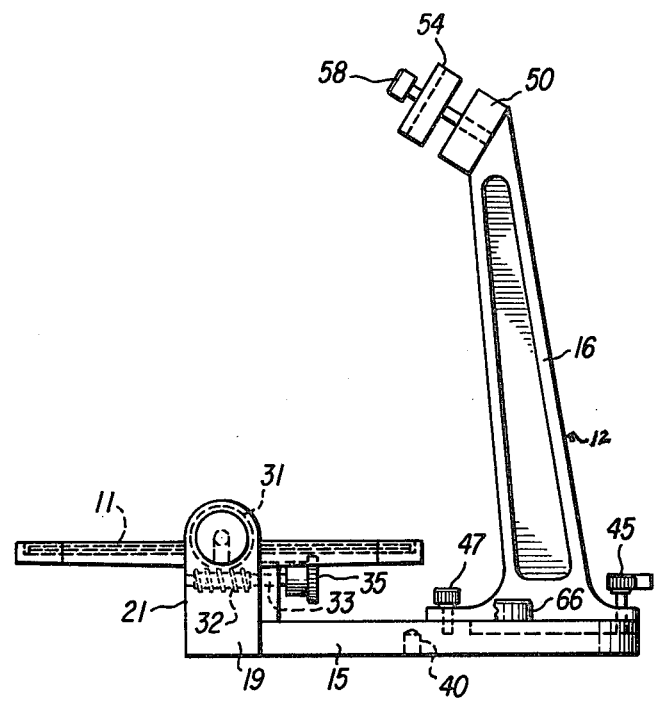
FIG. 2 is a side view of a support and mirror comprising the reflector.

Referring now to the drawings, there is shown a conventional binocular 10 which is supported above a plane first surface mirror 11 by a support, designated generally by the numeral 12, embodying the features of the instant invention. The support 12 is configured to rest on a flat surface or perhaps to be supported by a tripod so that the person using the binoculars 10 has his hands free for tasks other than holding the binoculars. As is best seen in FIGS. 1 and 2, the binocular 10 is held at an angle of approximately 30 degrees to the vertical, so that one may comfortably look into the binocular without neck strain. Moreover, by holding the binocular 10 at the 30 degree angle and laterally spacing the binocular from the mirror 11, the user avoids the problem of his image being reflected by the mirror.

Figure 3:
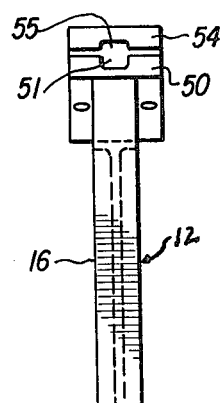
FIG. 3 is a back view of the support and mirror shown in FIG. 2.
Figure 3:
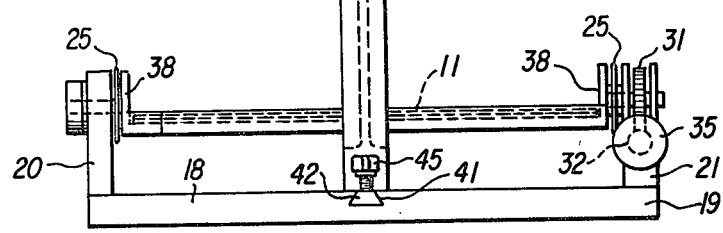
Figure 4:
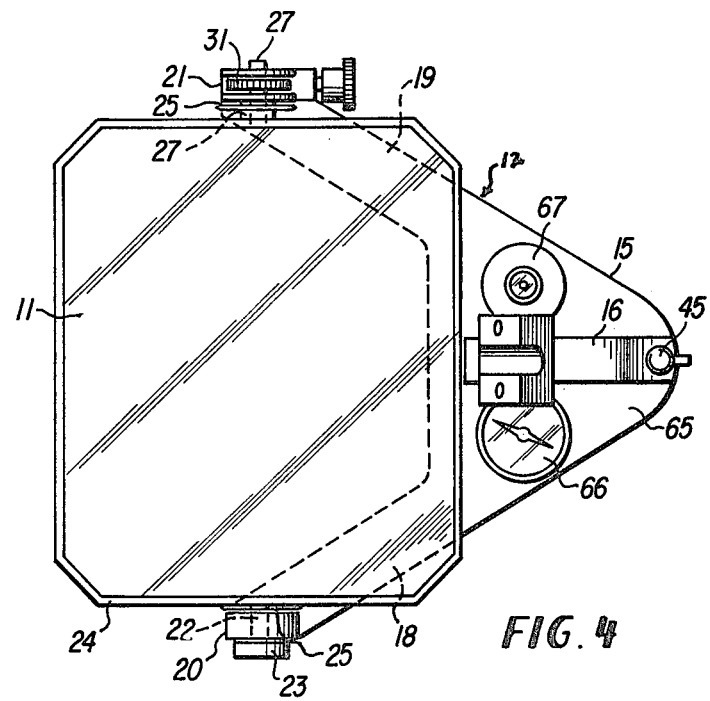
FIG. 4 is a top view of the support and mirror shown in FIGS. 2 and 3.

Referring now more specifically to FIGS. 2, 3, and 4, the support 12 includes a base 15 to which is attached a strut 16 that supports the binocular 10 in spaced relation to the mirror 11. The base 15 has a pair of legs 18 and 19 projecting obliquely with respect to one another to which legs are secured axel brackets 20 and 21, respectively. Journaled through axel bracket 20 is a short axel 22 which is secured to one end by a clamp knob 23 and is keyed to a mirror tray 24 at the other end. A Teflon washer 25 is disposed between the mirror tray 24 and the axel bracket 20 so as to ensure smooth rotation of the axel 22. The connection between the axel 22 and the mirror tray 24 is rigid so that they turn with one another. Knob 23 is used to indicate the angle at which observations are made.

At its other end, the mirror tray 24 is connected to the axel bracket 21 by a second short axel 27 which is keyed to the mirror tray and is journaled in bracket 21. A plastic washer 25 is disposed between the mirror tray 24 and bracket 21. The axel 27 has a gear 31 thereon which meshes with a gear 32 that is in turn mounted on a shaft 33 journaled in the bracket 21. An alternative embodiment uses a worm gear attached to axel 27, meshing with a worm that is mounted on bracket 21 and carries the knob 35. The shaft 33 also has a knob 35 affixed thereto. As the knob 35 is turned, the gear 32 rotates the gear 31 which in turn rotates the axel 27 and the mirror tray 24. In this way, the angular position of the mirror tray 24 can be finely adjusted. The mirror tray 24 has rims 37 at both ends thereof and side rims 38 which cooperate to retain and protect the mirror 11 in place.

The base 15 also includes a threaded bore 40 therethrough for receiving a tripod screw (not shown) so that the support 12 can be mounted on a conventional camera tripod.

A dovetail slot 41 is formed in the base 15, which slot receives a complementary dovetail projection 42 on the bottom of strut 16 to form a dovetail joint. Dovetail joint between slot 41 and projection 42 allows the strut 16 to be adjusted laterally with respect to mirror 11. A retaining screw 45 keeps the strut 16 from sliding in the slot 41. In an alternative embodiment, the strut 16 may be secured in place by a pair of screws, such as the retaining screw 45, and another screw 47 both of which are received in complementary screw holes in the base 15.

The strut 16 is approximately nine inches high. A binocular clamp base 50 is positioned at the top of the strut 16 and extends at an angle of approximately 60° with respect to the plane of the base 15 so that when the base is supported on a horizontal surface the clamp is tilted approximately 30° with respect to the vertical. The clamp base 50 includes a groove 51 that receives the spindle 53 of the binocular. A clamping plate 54 having a groove 55 fits over the groove 51 so as to retain the spindle 53 within the clamp base 50. A pair of screws 58 and 59 screw into screw blocks 60 and 61 on the strut 16 to secure the clamping plate 54 to the clamp base 50. Consequently, a structure is provided which rigidly retains the binocular 10 approximately at a 30° angle with respect to the vertical in spaced relation to the mirror 11.

The base 15 includes a relatively wide pad portion 65 on which are optionally mounted a compass 66 and a level 67 so that the user can at a glance tell whether or not the support 12 is properly oriented.

In an alternative embodiment, a clamp with a single screw may be used to apply pressure on the center of binoculars which do not provide an exposed center spindle. Such screw then fits on a projection of the vertical strut 16, just below the binocular.

The aforedescribed structure is merely examplary of the invention which is to be limited only by the following claims.

What is claimed is:

1. A portable optical instrument for astronomical observations, comprising in combination:

a binocular;

a base for providing a substantially stable, horizontally extending platform;

a strut attached to the base and extending upwardly therefrom;

obliquely extending clamp means positioned at the top of the strut for retaining the binocular on the strut at an oblique angle with respect to the strut and the horizontal extent of the base;

mirror support means secured beneath said obliquely extending clamp means;

a mirror secured to said mirror support means with the reflecting surface of the mirror facing upwardly and being intersected by the optical axes of the binocular when the binocular is secured to the clamp, and an uninterrupted space between the reflecting surface and the binocular, whereby, the base is horizontally disposed with respect to a stable surface, the binocular secured by the oblique clamp is disposed at an oblique angle with respect to the vertical and the mirror reflects astronomical observations through the binocular without an observer having to support the binocular and with the observer having his hands free.

2. The optical instrument of claim 1 wherein the mirror support means comprises a pair of supports positioned on the base in spaced relation to the strut and on opposite sides of the strut.

3. The optical instrument of claim 2 further including means for pivotally mounting the mirror between the supports whereby the angle of the mirror with respect to the optical axes may be varied.

4. The optical instrument of claim 1 wherein the obliquely extending clamp includes a groove and wherein the binocular has a spindle with an axis extending parallel with the optical axes thereof which is received in the groove when securing the binocular to the strut.

5. The support of claim 1, 2, 3 or 4 wherein the optical axes of the binocular are at an angle of about 30° with respect to the vertical when the base is supported to extend horizontally.

* * * * *

UNITED STATES PATENT AND TRADEMARK OFFICE
CERTIFICATE OF CORRECTION

PATENT NO. : 4,278,320
DATED : July 14, 1981
INVENTOR(S) : Emmanuel M. Carreira

It is certified that error appears in the above-identified patent and that said Letters Patent is hereby corrected as shown below:

The title should be changed to read --REFLECTING BINOCULAR STAND FOR ASTRONOMICAL OBSERVATIONS-- rather than "BINOCULAR STAND FOR ASTRONOMICAL OBSERVATIONS" as shown.

The name of the inventor should be changed to read --Emmanuel M. Carreira-- rather than "Emmanuel M. Carreira, Sr." as shown.

The name of the assignee should be changed to read --Thomas J. Dobbins-- rather than "Thomas A. Dobbins" as shown.

Signed and Sealed this

Seventeenth Day of July 1984

[SEAL]

Attest:

GERALD J. MOSSINGHOFF

Attesting Officer

Commissioner of Patents and Trademarks